No. 897,025. PATENTED AUG. 25, 1908.
J. O. M. SEIBERT.
MANIFOLDING TICKET RECORD AND TRAIN CHECK.
APPLICATION FILED MAY 18, 1906. RENEWED MAY 27, 1908.
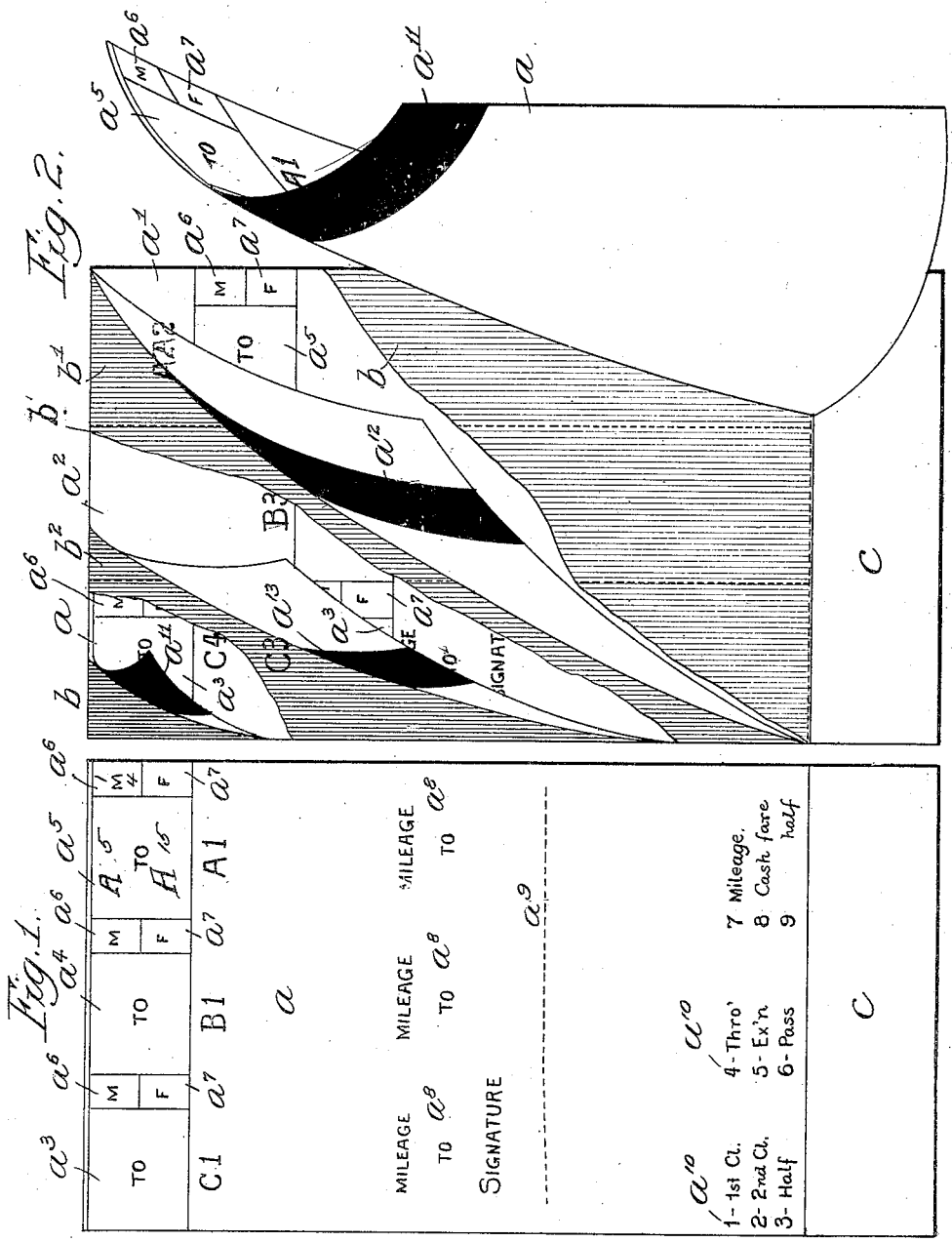

UNITED STATES PATENT OFFICE.

JACOB O. M. SEIBERT, OF CHICAGO, ILLINOIS, ASSIGNOR OF ONE-HALF TO LOUIS E. PFAADT, OF CHICAGO, ILLINOIS.

MANIFOLDING TICKET-RECORD AND TRAIN-CHECK.

No. 897,025.  Specification of Letters Patent.  Patented Aug. 25, 1908.

Application filed May 18, 1906, Serial No. 317,618. Renewed May 27, 1908. Serial No. 435,297.

*To all whom it may concern:*

Be it known that I, JACOB O. M. SEIBERT, a citizen of the United States, residing at Chicago, in the county of Cook and State of Illinois, have invented a new and useful Improvement in Manifolding Ticket-Records and Train-Checks, of which the following is a specification.

My invention relates to combination ticket-records and train-checks serving to enable a conductor simultaneously to make a record of the number and character of tickets presented to him and prepare corresponding train-checks for the passengers presenting the tickets.

My primary object is to provide simple, effective and economical means for effecting the purpose indicated.

The invention is illustrated in its preferred embodiment in the accompanying drawing, in which—

Figure 1 is a face view of a "pad", or book, of combination ticket-records and train-checks in accordance with my invention; Fig. 2, a view showing certain of the record sheets partially rolled and certain of the train-checks broken away to disclose the arrangement in the pad; and Fig. 3, a perspective view of a detached train-check.

In the embodiment shown the invention comprises a pad formed of alternating record-sheets and train-check cards $a$, $a^1$, $a^2$ and $b$, $b^1$, $b^2$—and all detachably connected with the end portion $c$ of the pad. Otherwise stated the record-sheets and train-check cards are arranged in series of pairs, a record-sheet overlying each train-check card. Each of the record sheets comprises a leaf of paper bearing the markings indicated in Fig. 1, it being understood, however, that the record sheet $a$ shown in Fig. 1 has had printed thereon the record of a ticket. Each record sheet is, in the form illustrated, designed to receive the record of three tickets; and each train-check card comprises three separable train-checks adapted to receive thereon a carbon copy of the markings made on the superposed record sheet by the conductor. Each record sheet is provided at or near its top with three spaces $a^3$, $a^4$, $a^5$. To the right of each of these spaces are two similar spaces $a^6$, $a^7$, one of which bears the letter M and the other the letter F, the letter being centrally arranged in the space in each instance. On the central portion of the sheet, beneath each of the spaces $a^3$, $a^4$, $a^5$, are arranged mileage blanks $a^8$. In a lower position is a signature blank $a^9$.

At the lower end of the sheet are provided characters $a^{10}$ indicating various ticket peculiarities, such as first-class, second-class, through, excursion, etc. By a system known to the railroad company, the characters $a^{10}$ may be employed by the conductor in noting on the record the character of the ticket presented to him. Thus, if a male passenger presents a first-class through ticket, the fact may be noted by indicating the character 1 above the letter M in the space $a^6$ and the character 4 below the letter M in the same space. If a female presents the ticket, the space bearing the letter F may be used. Each of the spaces $a^3$, $a^4$, $a^5$ bears the word "to" centrally placed, leaving space above and below to indicate the starting and the destination stations, respectively. Thus, the starting station A5 and the destination station A15 are indicated in the space $a^5$. The record sheets may be numbered as indicated, using the characters A1, B1, C1 on the first sheet, the characters A2, B2, C2 on the second sheet, and so on. The train-check cards underneath and alternating with the record sheets are numbered to correspond with the numbering on the record sheet directly above the train-check.

In order that the record made on the record sheets may be transferred to the train-checks, the record sheets are provided on their rear or bottom surfaces with carbonized portions or strips $a^{11}$, $a^{12}$, $a^{13}$ arranged in successively lower planes on the sheets and beneath the spaces provided for the characters indicating stations. The reason for this arrangement is that it enables a record to be transferred to the train-check card immediately beneath a record sheet without the transfer being continued onto the next record sheet or the next train-check card. This will be readily understood. It has been found, in practice, that by arranging the carbon-surfaced portions of three successive record sheets in staggered relation, the carbon-surfaced portion of the fourth record sheet may be arranged directly beneath the carbon-surfaced portion of the first record sheet, without danger of undesired transfer being effected.

In Fig. 1, the characters A5 and A15 have been represented as having been filled in by the conductor to designate the starting and destination stations; and also the numerals 1 and 4 have been inserted in the space $a^6$ at the right of the space $a^5$ to indicate a first-class through ticket presented by a male passenger. Fig. 3 represents a train-check as it would appear detached from the card $b$, after the record had been made as indicated in Fig. 1. It is noteworthy that any impression made upon the carbon-surfaced portion of the record sheet cannot be altered, owing to well-known properties of the paper. In practice, the train-check is exposed to view during travel, so that a train-auditor may know the starting point and destination point of the traveler.

It is obvious that the record sheets taken together constitute a record of the tickets received by the conductor, and that by the use of the same the report of the conductor may be greatly simplified, resulting in economy of time.

The foregoing detailed description has been given for clearness of understanding only, and no undue limitation should be understood therefrom.

What I regard as new, and desire to secure by Letters Patent, is—

1. A combination record and train-check pad, or book, comprising a plurality of alternating record-sheets and train-checks with strips of carbon surfaces arranged between the sheets and checks in staggered relation, said checks each having blanks on their front surfaces arranged opposite the carbon surfaces on their rear surfaces, for the purpose set forth.

2. A book or pad constituting combination train-checks and ticket-records; comprising a plurality of record sheets having on their front surfaces blanks with indicia indicating that they are to receive station-indicating characters and having also on their rear surfaces strips of transfer material, the blanks and transfer material of the several sheets bearing a staggered relation, and train-checks arranged in alternation between said record-sheets.

3. A book or pad constituting combination ticket-records and train-checks comprising a plurality of record-sheets, each record sheet having a plurality of transversely arranged spaces with means for indicating that they are to receive station-indicating characters and having also a carbon surface of limited area on its rear side back of said spaces, or blanks, the carbon-surfaced portions of the several record-sheets being arranged one below the other in series, and a plurality of train-check cards arranged in alternation between the record sheets, said cards having longitudinal perforate lines, for the purpose set forth.

4. The combination of a record-sheet having a plurality of transversely alined spaces with indicia for indicating that they are to receive station-indicating characters, said record-sheet being provided with numerals at the several spaces and with a transverse strip of carbonized surface back of said transversely alined spaces, and a train-check card thereunder comprising sections bearing the same numerals as the respective superposed portions of the record-sheet, said sections of said card being separated by perforate longitudinal lines, for the purpose set forth.

JACOB O. M. SEIBERT.

In presence of—
L. HEISLAR,
J. H. LANDES.